2,713,579

MEROCYANINE DYES CONTAINING AN AMINOMETHENYL GROUP

Edward B. Knott, Harrow, England, assignor to Eastman Kodak Company, Rochester, N. Y., a corporation of New Jersey No Drawing. Application September 2, 1953,
Serial No. 378,167

11 Claims. (Cl. 260—240.1)

This invention relates to merocyanine dyes, and more particularly, it relates to merocyanine dyes containing an aminomethenyl group and to methods for preparing them.

Merocyanine dyes containing an acid substituent have been previously described. See, for example, Brooker and White, U. S. Patent 2,526,632, issued October 24, 1950. I have now found a new class of merocyanine dyes containing a basic substituent. This substituent is an aminomethenyl group.

It is, accordingly, an object of my invention to provide a new class of merocyanine dyes. Still another object is to provide a method for making these dyes. Another object is to provide photographic silver halide emulsions sensitized with my new dyes. Other objects will become apparent from a consideration of the following description and examples.

The new merocyanine dyes of my invention can advantageously be represented by the following general formula:

I

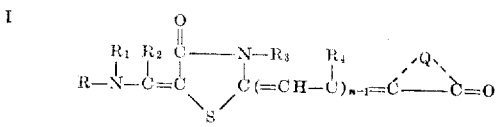

wherein R and $R_1$ each represent a hydrogen atom, an alkyl group (e. g. methyl, ethyl, n-propyl, isopropyl, n-butyl, isobutyl, carboxymethyl, carbomethoxymethyl, β-hydroxyethyl, benzyl, allyl, etc.), acyl (e. g. acetyl, propionyl, butyryl, benzoyl, etc.), aryl (e. g. phenyl, o-, m- and p-tolyl, etc.), cycloalkyl (e. g. cyclobutyl, cyclopentyl, cyclohexyl, etc.) or R and $R_1$ together can represent the non-metallic atoms necessary to complete a heterocyclic ring (e. g. piperidyl, morpholinyl, etc.), $R_2$ represents a hydrogen atom or an alkyl group (e. g. methyl, ethyl, etc.), $R_3$ represents an alkyl group (e. g. methyl, ethyl, carbethoxymethyl, allyl, benzyl, etc.), $R_4$ represents a hydrogen atom, an alkyl group (e. g. methyl, ethyl, etc.), or an alkoxyl group (e. g. methoxyl, ethoxyl, etc.), $n$ represents a positive integer of from 1 to 2, and Q represents the non-metallic atoms necessary to complete a heterocyclic nucleus containing from 5 to 6 atoms in the heterocyclic ring, such as those selected from the group consisting of those of the thiazolone series, for example: those of the 2,4(3,5)-thiazoledione series, such as 2,4(3,5)-thiazoledione, 3-alkyl-2,4(3,5)-thiazoledione (e. g. 3-ethyl-2,4(3,5)-thiazoledione, etc.), 3-phenyl-2,4(3,5)-thiazoledione, 3-α-naphthyl-2,4(3,5)-thiazoledione, etc., those of the 2-thio-2,4(3,5)-thiazoledione (rhodanine) series, such as 3-alkyl-2-thio-2,4(3,5)-thiazoledione (3-alkylrhodanines) (e. g. 3-ethyl-2-thio-2,4(3,5)-thiazoledione (or 3-ethylrhodanine), 3-phenyl-2-thio-2,4(3,5)-thiazoledione (3-phenylrhodanine), 3-α-naphthyl-2-thio-2,4(3,5)-thiazoledione (3-α-naphthylrhodanine), 3-(1-benzothiazyl)-2-thio-2,4(3,5)-thiazoledione (3-(1-benzothiazyl) rhodanine), etc., those of the 2-thio-2,5(3,4)-thiazoledione series, such as 3-alkyl (e. g. 3-methyl, 3-ethyl, etc.)-2-thio-2,5(3,4)-thiazolediones, etc., those of the 2-alkylmercapto-4(5)-thiazolone series, such as 2-ethylmercapto-4(5)-thiazolone, etc., those of the thiazolidone series, such as 4-thiazolidone or its 3-alkyl (e. g. ethyl, etc.), 3-phenyl or 3-α-naphthyl derivatives, those of the 2-alkylphenylamino-4(5)-thiazolone series (e. g. 2-ethylphenylamino-4(5)-thiazolone, etc.), those of the 2-diphenylamino-4(5)-thiazolone series; those of the 5(4)-thiazolone series, such as 2-ethylthio-5(4)-thiazolone, 2-benzylthio-5(4)-thiazolone, etc., those of the oxazolone series, for example: those of the 2-thio-2,4(3,5)-oxazoledione series, such as 3-alkyl-2-thio-2,4(3,5)-oxazoledione (e. g. 3-ethyl-2-thio-2,4(3,5)-oxazoledione, etc.), those of the 2-imino-2,4(3,5)-oxazolone (pseudohydantoin) series, etc.; those of the 5(4)-oxazolone series, such as 2-phenyl-5(4)-oxazolone, 2-ethyl-5(4)-oxazolone, etc., those of the 5(4)-isoxazolone series, such as 3-phenyl-5(4)-isoxazolone, etc., those of the imidazolone series, for example: those of the 2,4(3,5)-imidazoledione series, such as 2,4(3,5)-imidazoledione (hydantoin) or its 3-alkyl (e. g. ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl, etc.), 1,3-diphenyl, etc. derivatives, those of the 2-thio-2,4(3,5)-imidazoledione series, such as 2-thio-2,4(3,5)-imidazoledione (2-thiohydantoin) or its 3-alkyl (e. g. 3-ethyl, etc.), 3-phenyl or 3-α-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl), 1,3-diphenyl, etc. derivatives, those of the 2-alkylmercapto-5(4)-imidazolone series, such as 2-n-propylmercapto-5(4)-imidazolone; those of the thionaphthenone series, such as 2(1)-thionaphthenone or 1(2)-thionaphthenone; those of the pyrazolone series, such as pyrazolone or its 1-alkyl (e. g. methyl, ethyl, etc.), 1-phenyl, 1-naphthyl (e. g. 1-α-naphthyl), 3-alkyl (e. g. methyl, ethyl, etc.), 3-phenyl, 3-naphthyl (3-α-naphthyl), 1-alkyl-3-phenyl (e. g. 1-methyl-3-phenyl, etc.), 3-alkyl-1-phenyl (e. g. 3-methyl-1-phenyl, etc.), 1,3-dialkyl (e. g. 1,3-dimethyl, etc.), 1,3-diphenyl, etc. derivatives; those of the oxindole series, such as 2,3-dihydro-3-ketoindole, and like five-membered heterocyclic nuclei; those of the 2,4,6-triketohexahydro pyrimidine series, for example, 2,4,6-triketohexahydropyrimidine (barbituric acid), 2-thio-2,4,6-triketohexahydropyrimidine (2-thiobarbituric acid) as well as their 1-alkyl (e. g. 1-ethyl, etc.), or 1,3-dialkyl (1,3-diethyl, etc.) derivatives; those of the 3,4-dihydro-2(1)-quinolone series, such as 3,4-dihydro-2(1)-quinolone (dihydrocarbostyril); those of the 3,4-dihydro-2(1)-quinoxalone series, such as 3,4-dihydro-2(1)-quinoxalone (oxydihydroquinoxaline), etc.; those of the 3-phenomorpholone (1,4,3-benzoxazine-3(4)-one or benzo-β-morpholone) series, such as 3-phenomorpholone, etc.; those of the 1,4,2-benzothiazine-3(4)-one (ketodihydrobenzoparathiazine) series, such as ketodihydrobenzoparathiazine, etc., and like six-membered heterocyclic nuclei.

In accordance with my invention, I provide the dyes represented by Formula I above wherein $n$ is 1 (i. e. simple merocyanine dyes) by condensing together a compound selected from those represented by the following general formula:

II

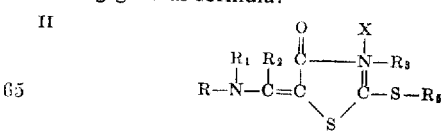

wherein R, $R_1$, $R_2$ and $R_3$ each have the values given above, $R_5$ represents an alkyl group (e. g. methyl, ethyl, etc.) or an aryl group (e. g. phenyl, o-, m- and p-tolyl, etc.), and X represents an anion (e. g. chloride, bromide, p-toluenesulfonate, benzene sulfonate, methyl sulfate, ethyl sulfate, with a compound selected from those represented by the following general formula:

III

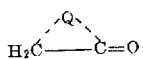

wherein Q has the values given above.

Advantageously, I provide the dyes represented by Formula I above wherein $n$ is 2 by condensing together a compound selected from those represented by the following general formula:

IV

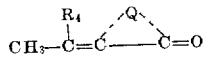

wherein $R_4$ and Q each have the values given above, with a compound selected from those represented by Formula II above.

The condensations of the compounds of Formula II with those of Formula III or IV can be carried out in the presence of a basic condensing agent, such as the trialkylamines (e. g. trialkylamine, tri-n-butylamine, tri-n-propylamine, triisobutylamine, etc.), N-alkylpiperidines (e. g. N-methylpiperidine, N-ethylpiperidine, etc.), N,N-dialkylanilines (e. g. N,N-dimethylaniline, N,N-diethylaniline, etc.) etc. The condensations can advantageously be carried out in the presence of an inert solvent, such as pyridine, lower aliphatic alcohols (e. g. ethanol, n-propanol, n-butanol, etc.) 1,4-dioxane, etc. Heat accelerates the condensations and temperatures varying from room temperature to the reflux temperature of the reaction mixture can be used.

The intermediates represented by Formula II above can advantageously be prepared by heating together a compound selected from those represented by the following general formula:

V

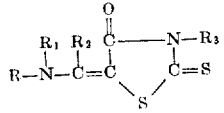

wherein R, $R_1$, $R_2$ and $R_3$ each have the values given above with an alkyl salt selected from those represented by the following general formula:

VI

$R_5$—X wherein $R_5$ has the values given above. The intermediates of Formula V can advantageously be prepared by condensing together a compound selected from those represented by the following general formula:

VII

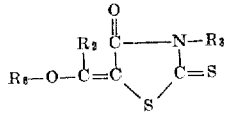

wherein $R_2$ and $R_3$ each have the values given above, and $R_6$ represents an alkyl group (e. g. methyl, ethyl, etc.) with a nitrogen compound selected from those represented by the following general formula:

VIII

R—NH wherein R and $R_1$ each have the values given above. Examples 1–15 and 60 below describe the preparation of a number of intermediates coming within the scope of Formula VII above. Examples 16–30, 52, 53, 54 and 61 below describe the preparation of a number of intermediates coming within the scope of V above.

The preparation of a number of intermediates coming within the scope of IV above has been described in Collins et al. British Patent 528,803 (Ilford), accepted November 7, 1940. This patent describes only intermediates of Formula IV above wherein $R_4$ is a hydrogen atom or an alkyl group. Intermediates of Formula IV wherein $R_4$ is an alkoxyl group have been previously described in Kendall et al. British Patent 544,647 (Ilford), accepted April 22, 1942. The preparation of a number of intermediates coming within the scope of IV has also been described in my copending application Serial No. 309,743, filed September 15, 1952. Also, it will be noted that Formulas IV and VII are identical when $R_2$ represents a methyl group and $R_4$ represents an alkoxyl group. The preparation of the intermediates of VII wherein $R_2$ represents a hydrogen atom has been described in Kendall et al. British Patent 633,736 (Ilford), accepted December 19, 1949.

The dyes of Formula I above wherein R and $R_1$ represent an acyl group can advantageously be prepared by condensing a mero-cyanine dye selected from those represented by I above wherein R or $R_1$ (or both) represent a hydrogen atom with a carboxylic anhydride (e. g. acetic, propionic, butyric, isobutyric, benzoic, etc. anhydrides).

The following examples will serve to illustrate more fully the manner whereby I practice my invention.

*Example 1.—3-carbethoxymethyl-5-1'-ethoxyethylidene-2-thiothiazolid-4-one*

3-carbethoxymethylrhodanine (4.38 g.), ethyl orthoacetate (6.0 cc.), and acetic anhydride (25.0 cc.) were refluxed for one hour and the solvents removed. There were thus obtained 4.9 g. of residual solid (yield=85% of theory) as silky, buff needles melting at 105° C. on recrystallization from ligroin.

*Example 2.—3-carbethoxymethyl-5-ethoxymethylene-2-thiothiazolid-4-one*

3-carboxymethyl-2-thiothiazolid-4-one (10 g.), ethyl orthoformate (15 cc.) and acetic anhydride (25 cc.) were refluxed for 2 hours. Removal of the solvent gave a tar which was extracted with boiling ligroin (4×100 cc.). The extracts, after concentration to 100 cc. gave rust needles (5.2 g.) on chilling. From isopropanol it formed pale yellow needles, M. P. 102° C.

Similar treatment of 3-carbethoxymethyl-2-thiothiazolid-4-one gave the same product.

*Example 3.—3-carbethoxymethyl-5-1'-ethoxypropylidene-2-thiothiazolid-4-one*

3-carboxymethyl-2-thiothiazolid-4-one (30 g.), ethyl orthopropionate (50 cc.) and acetic anhydride (100 cc.) were refluxed for 1 hour and the solvents removed under reduced pressure. The residual oil was extracted with boiling ligroin until no furtherer yellow color appeared in the solvent. Concentration to 100 cc. followed by chilling gave brown crystals (7.2 g.) which formed brown leaflets, M. P. 98° C., from isopropanol.

*Example 4.—5-ethoxymethylene-3-phenyl-2-thiothiazolid-4-one*

3-phenyl-2-thiothiazolid-4-one (20.7 g.), ethyl orthoformate (30 cc.) and acetic anhydride (100 cc.) were refluxed for 1 hour in an oil bath at 140° C. Removal of solvents under reduced pressure gave a red solid which was boiled up with ethanol (100 cc.) to remove the red dye. The buff powder was washed with acetone and it (14.0 g.) formed flat cream needles, M. P. 150–151° C., from ethanol.

*Example 5.—5-1'-ethoxyethylidene-3-phenyl-2-thiothiazolid-4-one*

Obtained similarly from 3-phenyl-2-thiothiazolid-4-one and ethyl orthoacetate in 93.5% yield, formed orange needles, M. P. 164–166° C., from methanol.

*Example 6.—5-1'-ethoxypropylidene-3-phenyl-2-thiothiazolid-4-one*

Obtained similarly using ethyl orthopropionate it formed yellow plates, M. P. 180–182° C.

*Example 7.—3-allyl-5-ethoxymethylene-2-thiothiazolid-4-one*

3-allyl-2-thiothiazolid-4-one (7.0 g.), ethyl orthoformate (25 cc.) and acetic anhydride (50 cc.) were refluxed for 5 hours and the solvents removed. The purple tar was dissolved in isopropanol (25 cc.), chilled and scratched. The crystals were collected and washed with ice-cold isopropanol to remove oxonol dye. It (6.4 g.) formed glassy, garnet needles, M. P. 54–55° C., from cyclohexane.

*Example 8.—3-allyl-5-1'-ethoxyethylidene-2-thiothiazolid-4-one*

Same as for Example 7 using ethyl orthoacetate (25 cc.); it (8.7 g.) formed large brown plates, M. P. 63–54° C., from light petroleum (B. P. 60–80° C.).

*Example 9.—3-allyl-5-1'-ethoxypropylidene-2-thiothiazolid-4-one*

Same as for Example 7 using ethyl orthopropionate; it (6.0 g.) formed yellow needles, M. P. 62–63° C., from isopropanol.

*Example 10.—3-benzyl-5-ethoxymethylene-2-thiothiazolid-4-one*

3-benzyl-2-thiothiazolid-4-one(5.5 g.), ethyl orthoformate (25 cc.) and acetic anhydride (50 cc.) were refluxed for 5 hours and the solvents removed. The solid (5.2 g.) formed pink needles, M. P. 87° C., from isopropanol.

*Example 11.—3-benzyl-5-1'-ethoxyethylidene-2-thiothiazolid-4-one*

Proceeding as in Example 10 but using ethyl orthoacetate instead of ethyl orthoformate the product (4.2 g.) was obtained as flat, straw colored needles, M. P. 109° C., from isopropanol.

*Example 12.—3-cyclohexyl-5-ethoxymethylene-2-thiothiazolid-4-one*

3-cyclohexyl-2-thiothiazolid-4-one (11.2 g.), ethyl orthoformate (25 cc.) and acetic anhydride (100 cc.) were refluxed for 2¼ hours and the solvents removed. The product (7.1 g.) was obtained as pale yellow needles, M. P. 139–140° C., from isopropanol.

*Example 13.—3-cyclohexyl-5-1'-ethoxyethylidene-2-thiothiazolid-4-one*

3-cyclohexyl-2-thiothiazolid-4-one (56 g.), ethyl orthoacetate (135 cc.) and acetic anhydride (500 cc.) were refluxed for 6 hours and the solvent removed. The product (44.0 g.) formed pale orange flakes, M. P. 125–126° C., from isopropanol.

*Example 14.—3-allyl-5-1'-methoxyethylidene-2-thiothiazolid-4-one*

3-allyl-2-thiothiazolid-4-one(8.7 g.), methyl orthoacetate (10.5 cc.) and acetic anhydride (50 cc.) were refluxed for 5 hours. Further orthoacetate (10.5 cc.) and anhydride (50 cc.) were added and refluxed a further 6 hours. Removal of solvent left an oil which crystallized on standing. From isopropanol (thrice), it (5.1 g.) formed brown needles, M. P. 83–84° C.

*Example 15.—3-carbethoxymethyl-5-1'-methoxyethylidene-2-thiothiazolid-4-one*

3-carbethoxymethyl-2-thiothiazolid-4-one (11.0 g.), methyl orthoacetate (21 cc.) and acetic anhydride (100 cc.) were refluxed for 1 hour and the solvents removed. The solid (13.4 g.) formed straw-colored needles, M. P. 113–114.5° C., from isopropanol.

*Example 16.—5-1'-anilinoethylidene-3-carbethoxymethyl-2-thiothiazolid-4-one*

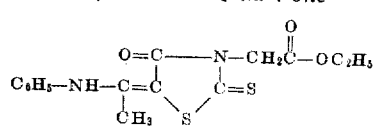

3 - carbethoxymethyl - 5 - 1' - ethoxyethylidene - 2 - thiothiazolid-4-one (2.9 g.), aniline (0.92 cc.), and ethanol (10 cc.) were refluxed for 30 minutes, cooled, and the crystals (2.65 g.) recrystallized from ethanol (150 cc.). It formed golden laths, M. P. 173–175° C.

*Example 17.—3-carbethoxymethyl-5-piperid-1'-ylmethylene-2-thiothiazolid-4-one*

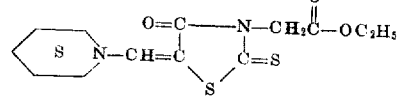

3 - carbethoxymethyl - 5 - ethoxymethylene - 2 - thiothiazolid-4-one )1.4 g.), ethanol (10 cc.) and piperidine (0.5 cc.) reacted at room temperature. The mixture was then heated for 2 minutes on the steam bath, cooled and the crystals collected. From benzene it (1.2 g.) formed fine, pale yellow needles, M. P. 146–147° C.

*Example 18.—3-carbethoxymethyl-5-morpholin-3'-ylmethylene-2-thiothiazolid-4-one*

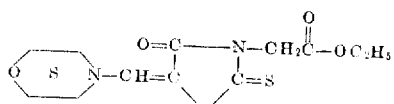

Proceeding as for Example 13 but using morpholine (0.45 cc.) the product (1.5 g.) formed flat, yellow needles, M. P. 172–173° C., from benzene.

*Example 19.—3-barbethoxymethyl-5-N-methylanilinomethylene-2-thiothiazolid-4-one*

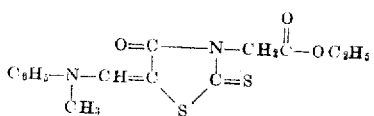

3 - carbethoxymethyl - 5 - ethoxymethylene - 2 - thiothiazolid-4-one (1.4 g.), ethanol (10 cc.) and N-methylaniline (0.55 cc.) were refluxed for 30 minutes. The crystals (0.7 g.) which separated on chilling formed pale, orange-brown laths, M. P. 146–149° C., from ethanol.

*Example 20.—5-benzylaminomethylene - 3 - carbethoxymethyl-2-thiothiazolid-4-one*

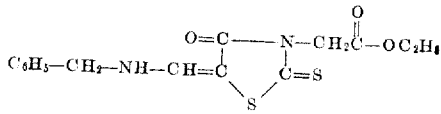

3 - carbethoxymethyl - 5 - ethoxymethylene - 2 - thiothiazolid-4-one (1.4 g.), benzylamine (0.55 cc.) and ethanol (10 cc.) were refluxed for ½ hour. The solution was chilled overnight and the yellow needles (1.05 g.) recrystallized from ethanol. It formed yellow needles M. P. 109–110° C.

*Example 21. — 3 - allyl - 5 - ethylaminomethylene - 2-thiothiazolid-4-one*

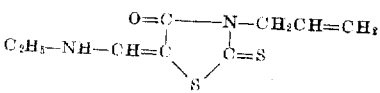

3 - allyl - 5 - ethoxymethylene - 2 - thiothiazolid - 4-one (4.6 g.) and ethanol (15 cc.) were shaken to dissolve and ethylamine (5 cc. 33% alcoholic solution) was added. Heat was evolved and the liquid set solid with crystals. These (4.0 g.) were collected after chilling and washed with a little ice-cold ethanol. It formed soft, pale yellow threads, M. P. 132° C., from ethanol.

*Example 22. — 3 - allyl - 5 - diethylaminomethylene - 2-thiothiazolid-4-one*

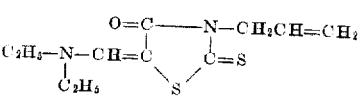

3 - allyl - 5 - ethoxymethylene - 2 - thiothiazolid - 4-one (2.3 g), ethanol (10 cc.) and diethylamine (1.05 cc.) were heated for 2 minutes on the steam bath. The crystals (1.7 g.) were collected after chilling and formed flat, yellow needles, M. P. 74° C., from isopropanol.

*Example 23. — 3 - allyl - 5 - morpholin - 3' - ylmethylene-2-thiothiazolid-4-one*

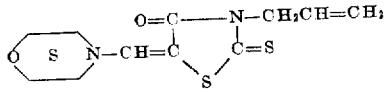

3-allyl-5-ethoxymethylene-2-thiothiazolid-4-one (2.3 g.), ethanol (10 cc.) and morpholine (0.95 cc.) were mixed. The reaction product separated rapidly and the reaction was completed by heating for 2 minutes on the steam bath. It (2.3 g.) formed flat, yellow needles, M. P. 180° C., from benzene.

*Example 24. — 3-carbethoxymethyl-5-cyclohexylaminomethylene-2-thiothiazolid-4-one*

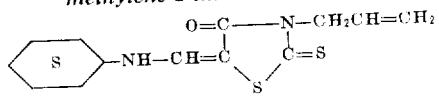

3 - carbethoxymethyl - 5 - ethoxymethylene - 2 - thiothiazolid-4-one (2.75 g.), ethanol (10 cc.) and cyclohexylamine (1.25 cc.) were heated on the steam bath for 5 minutes, chilled and the crystals (2.3 g.) collected. It formed yellow tablets, M. P. 133–134° C., from isopropanol.

*Example 25. — 3-allyl-5-n-octylaminomethylene-2-thiothiazolid-4-one*

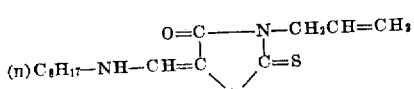

3 - allyl-5-ethoxymethylene-2-thiothiazolid-4-one (2.3 g.), ethanol (10 cc.) and n-octylamine (1.3 g.) were heated on the steam bath for 5 minutes. The whole solidified on chilling. It (2.85 g.) formed pale yellow threads, M. P. 98–100° C., from ethanol.

*Example 26. — 2,5-diaza-1,6-di-(3-carbethoxymethyl-4-keto-2-thiothiazolidin-5-ylidene)hexane*

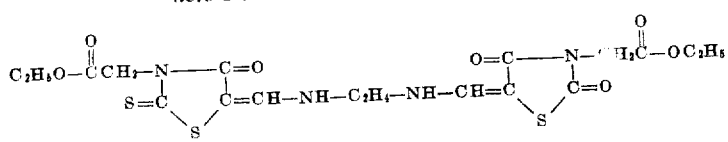

3 - carbethoxymethyl - 5 - ethoxymethylene - 2 - thiothiazolid-4-one (5.5 g.) was dissolved in boiling ethanol (25 cc.) and ethylenediamine hydrate (0.81 cc.) added, then refluxed 15 minutes. A thick oil separated on chilling. It slowly crystallized (3.6 g.), was dissolved in boiling ethanol (150 cc.) and obtained as soft, pale yellow needle aggregate, M. P. 145° C.

*Example 27. — 3-carbethoxymethyl-5-dibenzylaminomethylene-2-thiothiazolid-4-one*

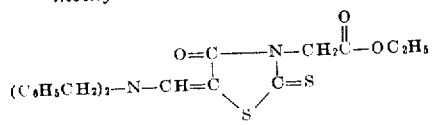

3-carbethoxymethyl - 5 - ethoxymethylene - 2 - thiothiazolid-4-one (5.5 g.), dibenzylamine (3.85 cc.) and ethanol were refluxed for 30 minutes. Chilling gave a tar which slowly crystallized. From ethanol it (8.0 g.) formed soft, slender yellow needles, M. P. 103–104° C.

*Example 28. — 3 - carbethoxymethyl - 5 - dicyclohexylaminomethylene-2-thiothiazolid-4-one*

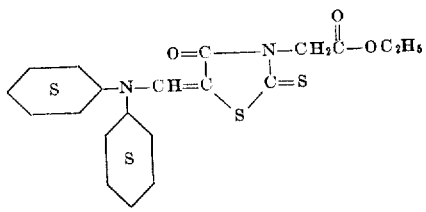

3 - carbethoxymethyl - 5 - ethoxymethylene - 2 - thiothiazolid-4-one (3.5 g.) dicyclohexylamine (2.4 cc.) and ethanol (15 cc.) were refluxed for 30 minutes. The solid (3.8 g.) formed pale yellow tablets, M. P. 159° C., from ethanol.

*Example 29.—3-carbethoxymethyl-5-1'-ethylaminoethylidene-2-thiothiazolid-4-one*

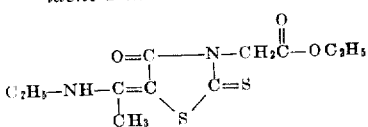

3 - carbethoxymethyl - 5 - 1'- ethoxyethylidene - 2 - thiothiazolid-4- one (2.9 g.), ethanol (10 cc.) and ethylamine (33% alcoholic, 2.5 cc.) were mixed. A solid separated and the whole was heated for 2 minutes on a steam bath. It (2.9 g.) formed soft, creamy plates, M. P. 121° C., from ethanol.

*Example 30.—3-allyl-5-1'-ethylaminoethylidene-2-thiothiazolid-4-one*

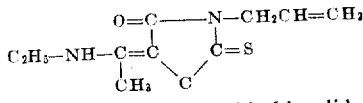

3-allyl-5-1'-ethoxyethylidene-2-thiothiazolid-4-one (2.45 g.); ethanol (10 cc.) and ethylamine (33% alcoholic, 2.5 cc.) were mixed then heated for 5 minutes on a steam bath. The substance (2.25 g.) which crystallized slowly on chilling formed straw-colored flakes, M. P. 65° C., from ethanol.

*Example 31.—3-carbethoxymethyl-2-(3-carbethoxymethyl - 4 - keto - 2 - thiothiazolidin - 5 - ylidene)- 5-piperid-1'-ylmethylenethiazolid-4-one*

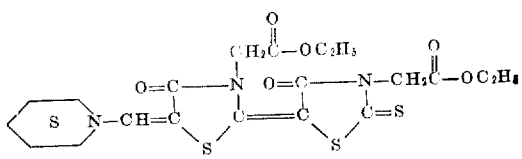

The intermediate of Example 17 (1.6 g.) and methyl p-toluenesulfonate (0.95 g.) were fused for 2 hours at 130° C. 3-carbethoxymethyl-2-thiothiazolid-4-one (1.1 g.), ethanol (10 cc.) and triethylamine (0.8 cc.) were added and the whole refluxed on the steam bath for 2 minutes. The solid mass of crystals were collected and well washed with ethanol. It (1.5 g.) formed soft yellow needle rosettes, M. P. 234° C., from benzene-ethanol.

It sensitized a silver chlorobromide emulsion powerfully with a peak at 530 mu at 0.5 g. per 1000 g. equivalent of silver nitrate.

*Example 32.—3-carbethoxymethyl-2-(3-carboxymethyl-4-keto - 2 - thiothiazolidin - 5 - ylidene) - 5 - morpholin-3'-ylmethylenethiazolid-4-one*

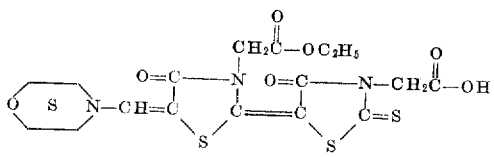

The intermediate of Example 18 (0.95 g.) and dimethylsulphate (0.3 cc.) were fused at 125° C. for 30 minutes. 3-carboxymethyl-2-thiothiazolid-4-one (0.6 g.), ethanol (10 cc.) and triethylamine (1.0 cc.) were added and the whole heated on a steam bath for 10 minutes. After cooling the clear solution was acidified with dilute acetic acid. The crystals (1.1 g.) which separated overnight formed yellow threads, M. P. 251° C. (dec.) from methanol. It sensitized a silver chlorobromide emulsion powerfully with a peak at 530 mu at 0.5 g. per 1000 g. equivalent of silver nitrate.

*Example 33.—3-allyl-2-(2-ethylthio-5-ketothiazolin-4-ylidene)-5-n-octylaminomethylene thiazolid-4-one*

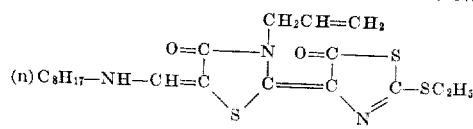

The intermediate of Example 25 (0.8 g.) and methyl p-toluenesulphonate (0.5 g.) were fused at 140° C. for 2 hours. N-dithiocarbethoxyglycine (1.0 g.), and acetic anhydride (20 cc.) were heated on a steam bath for 1 hour and the solvents removed. The residual oil and the quaternary salt were mixed with ethanol (10 cc.) and triethylamine (1 cc.) and heated for 5 minutes on a steam bath. The yellow needles (0.3 g.) obtained on chilling formed soft, yellow threads, M. P. 156° C. from ethanol.

*Example 34.—3 - carbethoxymethyl - 2 - (3 - ethyl - 4 - keto - 2 - thiooxazolidin - 5 - ylidene) - 5 - morpholin-3'-ylmethylenethiazolid-4-one*

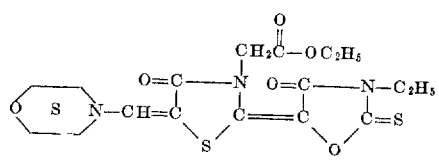

The intermediate of Example 18 (1.0 g.) and methyl p-toluenesulphonate (0.6 g.) were fused at 130° C. for 1 hour. 3-ethyl-2-thiooxazolid-4-one (0.5 g.), ethanol (10 cc.) and triethylamine (0.5 cc.) were added and heated on a steam bath for 10 minutes. The yellow grains (0.5 g.) formed yellow needles, M. P. 155–157° C., from isopropanol.

In a manner similar to that illustrated above, the following dyes of Examples 35 to 44 were prepared. Recrystallizations were made from benzene-ethanol.

*Example 35*

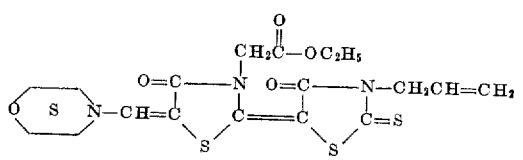

| | |
|---|---|
| Intermediate IV | From Example 18. |
| Intermediate III | 3-allyl-2-thiothiazolid-4-one. |
| Yield | 70%. |
| Appearance | Yellow needles. |
| M. P. | 246° C. |

It sensitized a gelatino-silver chlorobromide emulsion with a maximum at 510 mu.

*Example 36*

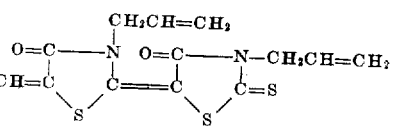

| | |
|---|---|
| Intermediate IV | From Example 25. |
| Intermediate III | 3-allyl-2-thiothiazolid-4-one. |
| Yield | 62%. |
| Appearance | Orange prisms. |
| M. P. | 127–128° C. |

It sensitized a photographic silver chlorobromide emulsion and a photographic silver iodobromide emulsion with maxima at 490 mu.

*Example 37*

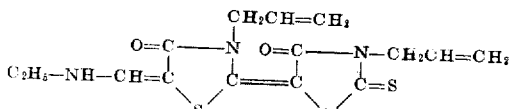

| | |
|---|---|
| Intermediate IV | From Example 21. |
| Intermediate III | 3-allyl-2-thiothiazolid-4-one. |
| Yield | 72%. |
| Appearance | Orange flakes. |
| M. P. | 177° C. |

*Example 38*

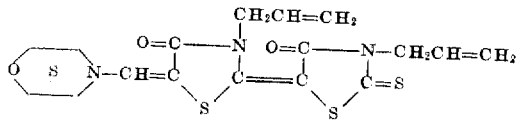

| | |
|---|---|
| Intermediate IV | From Example 23. |
| Intermediate III | 3-allyl-2-thiothiazolid-4-one. |
| Yield | 66%. |
| Appearance | Ochre needles. |
| M. P. | 244° C. |

*Example 39*

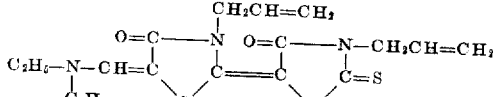

| | |
|---|---|
| Intermediate IV | From Example 22. |
| Intermediate III | 3-allyl-2-thiothiazolid-4-one. |
| Yield | 47%. |
| Appearance | Orange threads. |
| M. P. | 182° C. |

*Example 40*

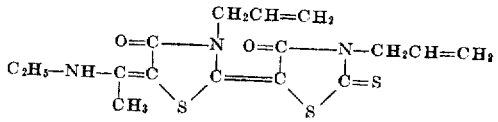

| | |
|---|---|
| Intermediate IV | From Example 30. |
| Intermediate III | 3-allyl-2-thiothiazolid-4-one. |
| Yield | 73%. |
| Appearance | Rust crystals. |
| M. P. | 210° C. |

*Example 41*

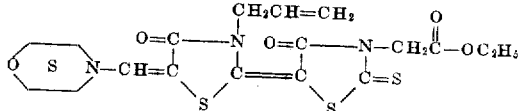

| | |
|---|---|
| Intermediate IV | From Example 23. |
| Intermediate III | 3-carbethoxymethyl-2-thiothiazolid-4-one. |
| Yield | 30%. |
| Appearance | Violet crystals. |
| M. P. | 224° C. |

Example 42

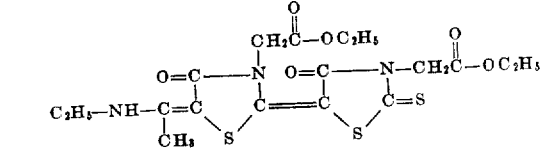

| | |
|---|---|
| Intermediate IV | From Example 29. |
| Intermediate III | Same as Example 41. |
| Yield | 70%. |
| Appearance | Orange threads. |
| M. P. | 158° C. |

Example 43

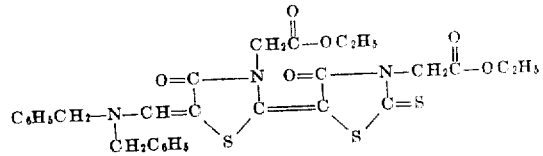

| | |
|---|---|
| Intermediate IV | From Example 27. |
| Intermediate III | Same as Example 41. |
| Yield | 28%. |
| Appearance | Yellow threads. |
| M. P. | 185° C. |

Example 44

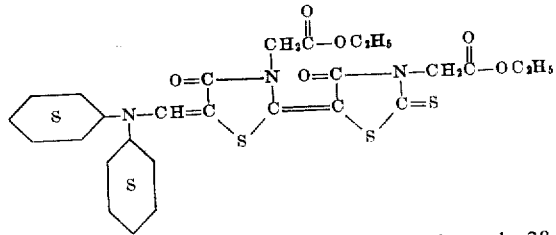

| | |
|---|---|
| Intermediate IV | From Example 28. |
| Intermediate III | Same as Example 41. |
| Yield | 64%. |
| Appearance | Brick-red. |
| M. P. | 251° C. |

Example 45

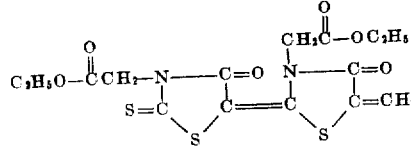

The intermediate of Example 26 (1.3 g.) and methyl p-toluenesulfonate (1.0 g.) were fused at 120° C. for 30 minutes. 3-carbethoxymethyl-2-thiothiazolid-4-one (1.1 g.), ethanol (20 cc.) and triethylamine (0.8 cc.) were added and the whole heated for 15 minutes on the steam bath. The dye oiled out, then crystallized on chilling. It (1.3 g.) formed orange crystals, M. P. 232° C., from pyridine-ethanol.

Example 46.—5-acetethylamidomethylene-3-allyl-2-(3-allyl-4-keto-2-thiothiazolidin-5-ylidene) thiazolid-4-one

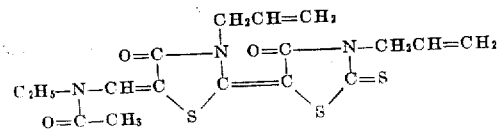

The dye of Example 37 (1.0 g.) and acetic anhydride (25 cc.) were refluxed for 3 hours and the solvent removed. The residual crystalline cake formed slender orange-brown needles, M. P. 160–161° C., from ethanol.

Example 47.—3-carbethoxymethyl-2-(3-carbethoxymethyl-4-keto-2-thiothiazolidine-5-ylidene - ethylidene)-5-piperid-1'-ylmethylenethiazolid-4-one

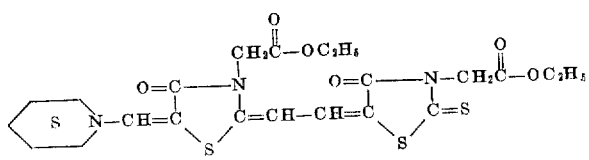

The intermediate of Example 17 (1.2 g.) and methyl p-toluenesulphonate (0.75 g.) were fused at 125° C. for 1¼ hours. 3-carbethoxymethyl-5-ethylidene-2-thiothiazolid-4-one (0.95 g.), ethanol (10 cc.) and triethylamine (0.6 cc.) were added and heated on a steam bath for 3 minutes. The dye (0.65 g.) which crystallized from the hot solution formed rust-red threads, M. P. 196° C. from benzene. It sensitized a silver chlorobromide emulsion with a peak at 630 mu and a silver iodobromide emulsion with a peak at 620 mu.

Example 48.—3 - carbethoxymethyl-2-[2-(3 - carbethoxymethyl-4-keto-2-thiothiazolidin - 5 - ylidene)prop-1-ylidene]-5-piperid-2'-ylmethylenethiazolid-4-one

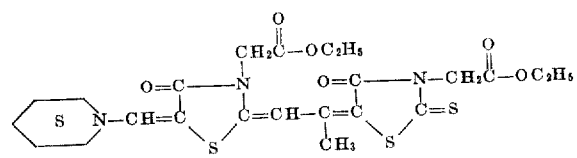

The intermediate of Example 17 (0.95 g.) and methyl p-toluenesulphonate (0.6 g.) were fused at 125° C. for 1 hour. 3 - carbethoxymethyl - 5 - prop-1'-ylidene-2-thiothiazolid-4-one (0.8 g.), ethanol (10 cc.) and triethylamine (0.5 cc.) were added and refluxed for 5 minutes. The dye (0.5 g.) collected, after chilling, formed soft, pink needles, M. P. 200° C., from benzene-ethanol. It sensitized a silver chlorobromide emulsion strongly with a peak at 620 mu and a silver iodobromide emulsion with a peak at 570–630 mu.

Example 49.—3 - carbethoxymethyl-2-[2-(3 - carbethoxymethyl-4-keto-2-thiothiazolidin-5-ylidene) - 2-methoxyethylidene]-5-piperid-1'-ylmethylenethiazolid-4-one

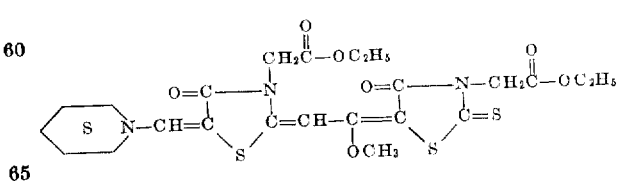

The intermediate of Example 17 (0.95 g.) and methyl p-toluenesulphonate (0.6 g.) were fused at 25° C. for 1 hour. Substance of Example 15 (0.85 g.), ethanol (10 cc.) and triethylamine (0.5 cc.) were added and refluxed for 5 minutes. The dye (0.6 g.) collected after chilling formed soft, red needles, M. P. 129° C., from benzene-ethanol. It sensitized a silver chlorobromide emulsion strongly with a peak at 600 mu.

*Example 50.—3-allyl-2-[2-(3-allyl-4-keto-2-thiothiazolidin-5-ylidene) prop-2-ylidene]-5-n-octylaminomethylenethiazolid-4-one*

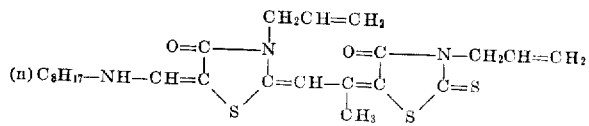

The intermediate of Example 25 (1.55 g.) and methyl p-toluenesulphonate (0.95 g.) were fused at 140° C. for 2 hours. 3 - allyl-5-prop-2'-ylidene-2-thiothiazolid-4-one (1.1 g.), ethanol (10 cc.) and triethylamine (0.8 cc.) were added and the whole refluxed for 5 minutes. After concentration and chilling the dye (0.8 g.) formed greenred threads, M. P. 138° C., from methanol.

*Example 51.—3-allyl-2-[2-(3-allyl-4-keto-2-thiothiazolidin-5-ylidene)-2-ethoxy ethylidene]-5-n-octylaminomethylenethiazolid-4-one*

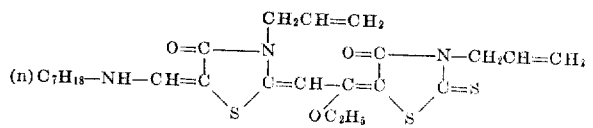

The intermediate of Example 25 (1.55 g.) and methyl p-toluenesulphonate (0.95 g.) were fused at 140° C. for 2 hours. The compound of Example 8 (1.25 g.), ethanol (10 cc.) and triethylamine (0.8 cc.) were refluxed for 5 minutes. The addition of water precipitated a tar which slowly crystallized. It was dissolved in hot cyclohexane and precipitated with light petroleum (40-60°). It (0.75 g.) formed glossy, green platelets, M. P. 138-140° C., from methanol.

*Example 52.—3 - allyl-5-1'-ethylaminopropylidene-2-thiothiazolid-4-one*

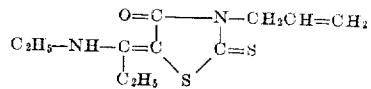

Compound of Example 9 (2.6 g.), ethanol (5 cc.) and 33% alcoholic ethylamine (2.5 cc.) were mixed and chilled for several weeks. The crystals (1.8 g.) formed orange flakes, M. P. 49-51° C., from isopropanol.

*Example 53.—3 - allyl - 5 - aminomethylene-2-thiothiazolid-4-one*

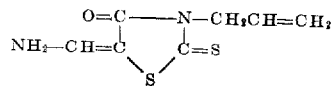

Compound of Example 7 (2.3 g.), ethanol (10 cc.) and 0.880 ammonia (5 cc.) were brought to boiling point on the steam bath. The solution was cooled and water (5 cc.) added. Crystallization commenced and water (10 cc.) was then added and the whole chilled overnight. The solid (1.8 g., 90%) formed orange-brown needles, M. P. 104-109° C., from aqueous ethanol.

*Example 54.—3 - allyl - 5 - carboxymethylaminomethylene-2-thiothiazolid-4-one*

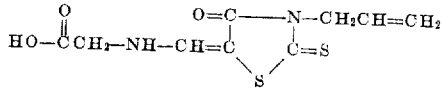

Compound of Example 7 (4.6 g.) was added to a solution of glycine (1.5 g.) and potassium hydroxide (1.15 g.) in water (5 cc.) and ethanol (10 cc.). The whole was heated for 5 minutes on the steam bath, cooled and acidified with dilute acetic acid. The required compound crystallized slowly on dilution with water. It (4.65 g., 90%) formed mustard yellow needles, M. P. 195-196° C., from aqueous ethanol.

*Example 55.—3 - allyl - 2 - [2 - (ethoxy - 2 - (2 - ethylthio - 5 - ketothiazolin - 4 - ylidene)ethylidene] - 5-morpholin-3'-ylmethylenethiazolid-4-one*

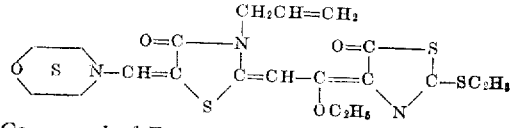

Compound of Example 23 (2.7 g.) and methyl p-toluenesulphonate (2.0 g.) were fused at 130° C. for 2 hours. 5 - 1' - ethoxyethylidene - 2 - ethylthiothiazol - 5 - one (2.3 g.), ethanol (10 cc.) and triethylamine (1.5 cc.) were added and refluxed for 5 minutes. The dye (1.1 g., 24%) collected after chilling formed soft magenta threads, M. P. 176° C., from ethanol.

*Example 56.—3 - allyl - 2 - (3 - allyl - 4 - keto - 2 - thiothiazolidin - 5 - ylidene) - 5 - carboxymethylaminomethylenethiazolid-4-one*

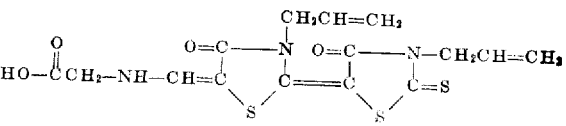

Compound Example 54 (1.3 g.) and methyl p-toluenesulphonate (0.95 g.) were fused at 130° C. for 1 hour. 3-allylrhodanine (0.9 g.), ethanol (10 cc.) and triethylamine (1.5 cc.) were added and the whole refluxed for 5 minutes. On acidifying with dilute acetic acid the dye crystallized. It (1.3 g., 65%) formed brown prisms, M. P. 224-226° C., from ethanol.

*Example 57.—3 - allyl - 2 - (2 - diphenylamino - 4 - ketothiazolin - 5 - ylidene) - 5 - morpholin - 3' - lymethylenethiazolid-4-one*

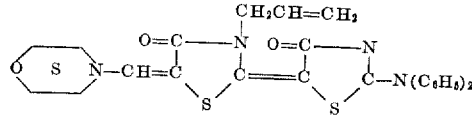

Compound of Example 23 (1.35 g.) and methyl p-toluenesulphonate (1.0 g.) were fused at 130° C. for 2 hours. 2-diphenylaminothiazol-4-one (1.35 g.), pyridine (10 cc.) and triethylamine (0.8 cc.) were added and heated on the steam bath for 15 minutes. Ethanol (30 cc.) was added and the crystals (1.2 g., 47.5%) collected after chilling. The dye formed an orange-brown crystalline powder, M. P. 290° C. (dec.), from benzene-ethanol.

*Example 58.—3 - allyl - 2 - (3 - allyl - 4 - keto - 2 - thiothiazolid - 5 - ylidene) - 5 - (3 - allyl - 4 - keto - 5 - n-octylaminomethylenethiazolidin - 2 - ylidene)thiazolid-4-one*

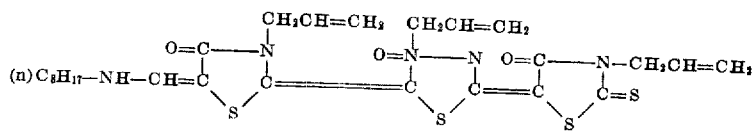

Dye of Example 36 (1.5 g.) and methyl p-toluenesulphonate (0.65 g.) were fused at 130° C. for 1 hour. 3-allylrhodanine (0.6 g.), ethanol (15 cc.) and triethylamine (0.5 cc.) were added and refluxed for 5 minutes. The dye (1.25 g., 63.5%) was collected after chilling and formed soft red needles, M. P. 199-201° C., from benzene-ethanol.

Example 59.—3 - allyl - 2 - [3 - allyl - 2 - (3 - allyl - 4-keto - 2 - thiothiazolidin - 5 - ylidene) - 4 - ketothiazolidin - 5 - ylidene] -5 - (3 - allyl - 4 - keto - 5 - n - octylaminomethylenethiazolidin-2-ylidene)thiazolid-4-one

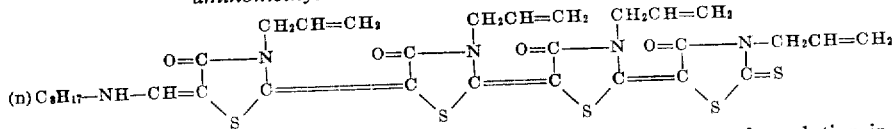

Dye of Example 58 (0.7 g.) and methyl p-toluenesulphonate (0.5 g.) were fused at 140° C. for 30 minutes. To the solid quaternary salt was added, 3-allylrhodanine (0.25 g.), and ethanol (15 cc.) and the flask warmed gently to dissolve the solids. The addition of triethylamine (0.3 cc.) gave an immediate precipitation of dye. It (0.6 g., 70%) formed a red, crystalline powder, M. P. 263° C., from pyridine.

Example 60.—5-1'-ethoxyethylidene - 3 - ethyl - 2 - thiothiazolid-4-one

Freshly distilled 3-ethylrhodanine (20 g.), ethyl orthoacetate (50 cc.) and acetic anhydride (100 cc.) were refluxed on a gauze for 4 hours and the solvents removed under reduced pressure. The residual oil solidified on chilling. From isopropanol a yield of 14.6 g. (51%) orange needles, M. P. 80° C., was obtained.

Example 61.—3 - ethyl - 5 - 1' - ethylaminoethylidene - 2-thiothiazolid-4-one

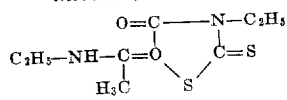

5 - 1' - ethoxyethylidene - 3 - ethyl - 2 - thiothiazolid-4-one (6.95 g.) was dissolved in hot ethanol (20 cc.). The solution was cooled until crystallization set in and a 33% alcoholic solution of ethylamine (9 cc.) was added. Heat was evolved and the required substance separated. The whole was refluxed for 5 minutes on a steam bath and then chilled. The yellow needles (6.7 g., 97%) were recrystallized from ethanol and obtained as flat yellow needles, M. P. 112–113° C.

Example 62.—3 - ethyl-2-(3-ethyl-2-thiothiazolidin - 5-ylidene)-5-1'-ethylamino ethylidenethiazolid-4-one

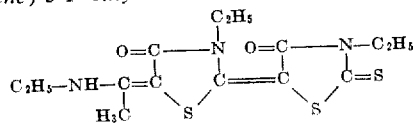

Compound of Example 61 (1.15 g.) and methyl toluene-p-sulphonate (1.0 g.) were fused together at 120° for 1 hour. 3-ethylrhodanine (0.85 g.), ethanol (20 cc.) and triethylamine (0.8 cc.) were added and the whole refluxed for 5 minutes. The dye which separated during this time was collected after chilling and washed with ethanol. It (1.4 g., 78.5%) formed orange needles M. P. 247° C., from benzene.

As shown in a number of the above examples, the new dyes of my invention are useful in spectrally sensitizing photographic silver halide emulsions when incorporated therein. The dyes are especially useful for extending the spectral sensitivity of the customarily employed gelatino silver chloride, gelatino silver chlorobromide, gelatino silver bromide, gelatino silver bromiodide, and gelatino silver chlorobromiodide developing-out emulsions. In several of the foregoing examples, the point of maximum sensitivity of gelatino silver chlorobromide and/or gelatino silver bromiodide emulsions sensitized with my new dyes is pointed out in connection with the description of the properties of certain of the dyes. To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of my new dyes. Where the dyes are quite insoluble in methyl alcohol, a mixture of acetone and pyridine is advantageously employed as a solvent. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of my new dyes, the following procedure is satisfactory:

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of my dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Tabulated below are sensitizing data obtained from dyes of a number of examples, which examples give an indication of the sensitizing properties of the dyes described. These data supplement those of the above examples. The sensitizing maxima are given in mu.

| Example | Silver chlorobromide | Silver iodobromide |
| --- | --- | --- |
| 33 | 480 |  |
| 34 | 490 | 490 |
| 37 | 530 | 530 |
| 38 | 525 | 525 |
| 39 | 535 | 530 |
| 40 | 530 | 530 |
| 41 | 530 | 530 |
| 42 | 530 | 530 |
| 43 | 530 | 530 |
| 44 | 520 | 525 |
| 45 | 530 | 530 |
| 46 | 510 | 500 |
| 49 | 570–640 | 540–630 |
| 50 | 590 | 580 |
| 51 | 560 | 550 |
| 55 | 530 | 520 |
| 56 | 470 |  |
| 57 | 570 | 575 |
| 58 |  |  |
| 59 | 520 |  |
| 62 |  |  |

Photographic silver halide emulsions, such as those listed above, containing the sensitizing dyes of my invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. application Ser. No. 771,380, filed August 29, 1947, etc.; or mixtures of such addenda. Dispersing agents for color couplers, such as those set forth in U. S. Patents 2, 322,027 and 2,304,940, can also be employed in the above-described emulsions.

What I claim as my invention and desire secured by Letters Patent of the United States is:

1. A merocyanine dye selected from those represented by the following general formula:

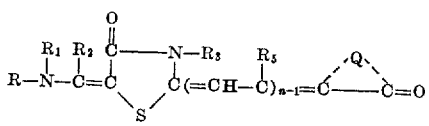

wherein R and $R_1$ each represents a member selected from the group consisting of a hydrogen atom, an alkyl group containing from 1 to 8 carbon atoms, an acetyl group, a propionyl group, a butyryl group, an isobutyryl group and a benzoyl group, a monocyclic aryl group of the benzene series, a cycloalkyl group containing from 4 to 6 atoms in the cycloalkyl ring, and R and $R_1$ together represent the non-metallic atoms necessary to complete a heterocyclic nucleus selected from the group consisting of piperidine and morpholine, $R_2$ represents a member selected from the group consisting of a hydrogen atom and an alkyl group containing from 1 to 2 carbon atoms, $R_3$ represents an alkyl group containing from 1 to 4 carbon atoms, $R_4$ represents a member selected from the group consisting of a hydrogen atom, an alkyl group containing from 1 to 2 carbon atoms, and an alkoxyl group containing from 1 to 2 carbon atoms, $n$ represents a positive integer of from 1 to 2 and Q represents the non-metallic atoms necessary to complete a heterocyclic nucleus selected from the group consisting of those of the 2,4(3,5)-thiazoledione series, those of the rhodanine series, those of the 2-thio-2,5(3,4)-thiazoledione series, those of the 2-alkylmercapto-4(5)-thiazolone series, those of the thiazolidone series, those of the 2-alkylphenylamino-4(5)-thiazolone series, those of the 2-diphenylamino-4(5)-thiazolone series, those of the 5(4)-thiazolone series, those of the 2-thio-2,4(3,5)-oxazoledione series, those of the pseudohydantoin series, those of the 5(4)-oxazolone series, those of the 5(4)-isoxazolone series, those of 2,4(3,5)-imidazoledione series, those of the 2-thio-2,4(3,5)-imidazoledione series, those of the 2-alkylmercapto-5(4)-imidazolone series, those of the thionaphthenone series, those of the pyrazolone series, those of the oxindole series, those of the 2,4,6-triketohexahydropyrimidine series, those of the 3,4-dihydro-2(1)-quinolone series, those of the 3,4-dihydro-2(1)-quinoxazolone series, those of the 3-phenomorpholone series, and those of the 1,4,2-benzothiazine-3(4)-one series.

2. A merocyanine dye selected from those represented by the following general formula:

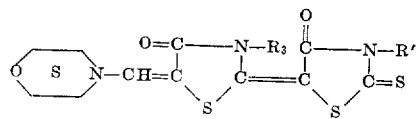

wherein R' and $R_3$ each represents a lower alkyl group.

3. A merocyanine dye selected from those represented by the following general formula:

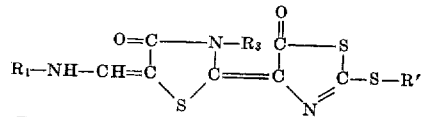

wherein $R_1$, R' and $R_3$ each represents an alkyl group.

4. A merocyanine dye selected from those represented by the following general formula:

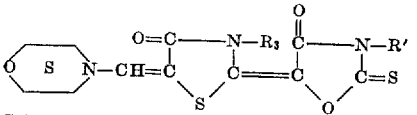

wherein R' and $R_3$ each represents a lower alkyl group.

5. A merocyanine dye selected from those represented by the following general formula:

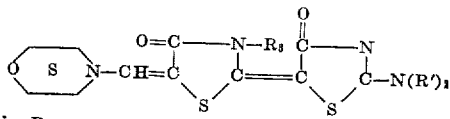

wherein $R_3$ represents a lower alkyl group and R' represents a monocyclic aryl group of the benzene series.

6. A merocyanine dye selected from those represented by the following general formula:

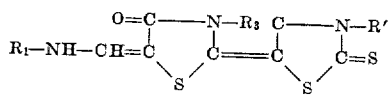

wherein $R_1$, $R_3$, and R' each represents a lower alkyl group.

7. The merocyanine dye having the following formula:

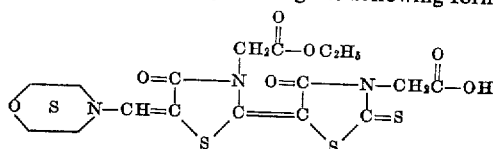

8. The merocyanine dye having the following formula:

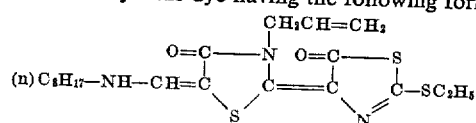

9. The merocyanine dye having the following formula:

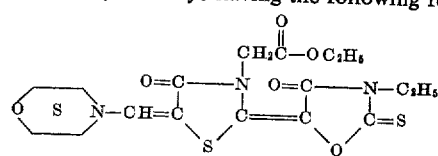

10. The merocyanine dye having the following formula:

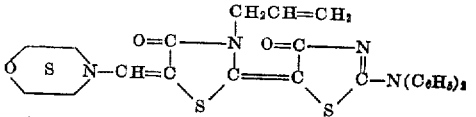

11. The merocyanine dye having the following formula:

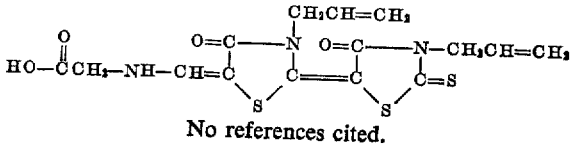

No references cited.

Certificate of Correction

Patent No. 2,713,579                            July 19, 1955

Edward B. Knott

It is hereby certified that error appears in the printed specification of the above numbered patent requiring correction and that the said Letters Patent should read as corrected below.

Column 5, line 64, for "113–114.5° C." read *113.5–114.5° C.*; columns 7 and 8, Example 26, right hand portion of the formula, for

 read column 8, Example 30, for that portion of the formula reading

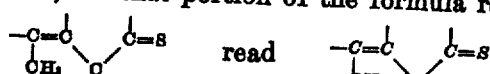 read column 14, line 43, Example 57, for "-lymethylene-" read *-ylmethylene-*; same Example 57, for the lower right hand portion of the formula reading

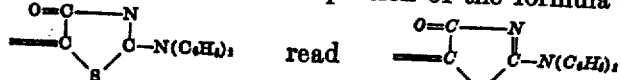 read columns 13 and 14, Example 58, for that portion of the formula reading

 read column 17, claim 1, for that portion of the formula reading

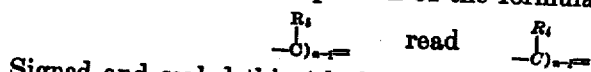 read

Signed and sealed this 4th day of October 1955.

[SEAL]

E. J. MURRY

Attest:
    *Attesting Officer.*

ROBERT C. WATSON
                                 *Commissioner of Patents.*